(12) United States Patent
Sawall et al.

(10) Patent No.: US 8,039,070 B1
(45) Date of Patent: Oct. 18, 2011

(54) EASY OPEN BAG AND FILM FOR USE IN THERMALLY PROCESSING FOOD AT ELEVATED TEMPERATURES

(75) Inventors: Bradley Thomas Sawall, Appleton, WI (US); Thomas Andrew Schell, Winnecone, WI (US); Benjamin Ray Stover, Centerville, IA (US)

(73) Assignee: Curwood, Inc., Oshkosh, WI (US)

( * ) Notice: Subject to any disclaimer, the term of this patent is extended or adjusted under 35 U.S.C. 154(b) by 494 days.

(21) Appl. No.: 12/357,264

(22) Filed: Jan. 21, 2009

(51) Int. Cl.
*B65B 53/00* (2006.01)
*F16B 4/00* (2006.01)

(52) U.S. Cl. ............ 428/34.9; 428/35.2; 428/35.7; 428/36.6; 428/36.7; 428/345; 428/347; 428/349; 428/355 EN; 428/500; 428/515; 428/516; 428/518; 426/243

(58) Field of Classification Search ............ 428/34.9, 428/35.2, 35.7, 36.6, 36.7, 345, 347, 349, 428/355 EN, 500, 515, 516, 518; 426/243
See application file for complete search history.

(56) References Cited

U.S. PATENT DOCUMENTS 7,276,269 B2 * 10/2007 Kraimer et al. .............. 428/35.7

\* cited by examiner

*Primary Examiner* — Michael C Miggins
(74) *Attorney, Agent, or Firm* — Cedric M. Richeson; Bryan J. Leitenberger (57) ABSTRACT

A heat-shrinkable film suitable for forming an easy opening cook-in bag is provided. The film comprises at least five layers, including an inner layer, an inner frangible layer, a barrier layer, an outer frangible layer, and an outer layer. The film is capable of being formed into a bag comprising a lap seal, a top end seal, and a bottom end seal, wherein the seals are heat sealed to a closed condition to contain and protect a product disposed therein. The lap seal, top end seal, and bottom end seal each are able to remain sealed during cook-in conditions. Additionally, the lap seal, top end seal, and bottom end seal each are peelable and easily openable by application of force.

37 Claims, 4 Drawing Sheets

EASY OPEN BAG AND FILM FOR USE IN THERMALLY PROCESSING FOOD AT ELEVATED TEMPERATURES

TECHNICAL FIELD

The present disclosure relates to improvements in the art of heat-shrinkable packaging, specifically to easy open, heat shrinkable packaging suitable for use in thermal processing of foodstuffs at elevated temperatures.

BACKGROUND

Manufacturers and wholesalers use flexible thermoplastic packaging films to provide economical, sanitary containers, which help protect and/or preserve the freshness and wholesomeness of their products. These films are often sold in bag (or pouch) form. For example, a single or multilayer film is made into bags or pouches using a tubular film or one or more flat sheets or webs of film by well known processes involving e.g. cutting, folding and/or sealing the film to form bags and pouches. The term pouch is often used to refer to a bag made from at least two separate sheets of film or having two heat seals leaving a single open side whereas bag is often used to refer to tubular films that have a single seal transverse to the machine direction of the tube leaving an open side or generically to also include pouches or any packaging having a, typically single, open side. These films and bags may be printed and may also be uniaxially or biaxially oriented, heat shrinkable, irradiated, or may contain film layers which are abuse resistant or puncture resistant or which are crosslinked or which enhance or retard or prevent transmission of light, gases, or liquids therethrough. Frequently, multilayer films having one or more barrier layers to oxygen and/or moisture such as: saran (a polyvinylidene chloride copolymer); a modified saran e.g. MA-saran containing methyl acrylate polymer units; ethylene vinyl alcohol (EVOH) copolymer; nylon; or acrylonitrile may be used with a heat sealing layer such as a copolymer of ethylene and vinyl acetate (EVA), ethylene alpha-olefin copolymer or blends thereof to produce bags for packaging oxygen and/or moisture sensitive foods e.g. processed pork or fresh red meat. Such bags help preserve meat in its original condition by preventing or reducing moisture loss and chemical changes in the meat structure due to oxidation reactions.

A typical package has one, two or three sides heat-sealed by the bag manufacturer leaving one open side to allow product insertion. For example, a processor may insert fresh, frozen or processed meat, ham, poultry, cheese, primal or subprimal meat cuts, ground beef, fruits, vegetables, bread or other products making a final seal to hermetically enclose the product in the bag. This final seal may follow gas evacuation (i.e. vacuum removal) or replacement of the gaseous environment within the bag by one or more gases to provide some advantage such as to assist product preservation. This final seal is frequently a heat seal similar to the initial seals produced by the bag manufacturer although the actual heat sealing equipment may vary.

Thus, bags are made: by transversely sealing tubular stock of monolayer or multilayer film and cutting off the tube portion containing the sealed end; by making two spaced apart transverse seals on tubular stock and cutting open the side of the tube; by superimposing flat sheets of film and sealing on three sides; or by folding a flat sheet and sealing two sides.

After a product is inserted, the bag is typically evacuated and the bag mouth sealed to enclose the product. At one time, the standard method for sealing was to fasten a clip around the mouth of the bag. However, heat sealing techniques are now also commonly employed to produce the final closure of the bag. For example, a bag mouth may be either hot bar sealed or impulse sealed. An impulse seal is made by application of heat and pressure using opposing bars similar to the hot bar seal except that at least one of these bars has a covered wire or ribbon through which electric current is passed for a very brief time period (hence the name "impulse") to cause the adjacent film layers to fusion bond. Following the impulse of heat the bars are typically cooled (e.g. by circulating coolant) while continuing to hold the bag inner surfaces together to achieve adequate sealing strength. Other sealing techniques are well known in the art and are described e.g. in The Wiley Encyclopedia of Packaging Technology, $2^{nd}$ Ed., Brody & Marsh editors, pp. 823-827 (John Wiley & Sons, Inc., 1997) which is hereby incorporated by reference.

There must be a strong continuous seal to prevent unwanted egress and ingress of gaseous, liquid, or solid materials between the bag exterior and interior. This is particularly necessary when the package is made of heat shrinkable film and is to be heat shrunk e.g. by being immersed in hot water to shrink the film against the packaged article since such shrinkage increases the stress on these seals. It is even more critical where the packages are to be thermally processed at elevated temperatures i.e. heated at sufficient times and temperatures for pasteurization or cooking or surface pasteurization (sometimes referred to as surface post-pasteurization). Thus, there is a continuing need for films which can be made into bags having strong seals especially those formed by hot bar and/or impulse sealing. Such films should provide strong seals able to withstand a range of temperatures and also be able to make such seals over a wide sealing temperature range without burn through of the seal area which can lead to weak seals and/or seal failure.

A very demanding application for heat shrinkable, heat sealable thermoplastic flexible films is for thermally processing meats. Bacterial contamination during food processing e.g. by *Listeria monocytogenes* is of great concern. To address health and safety concerns with processed foods, some processors have adopted a surface heat treatment at elevated temperatures sufficient to kill bacteria on already cooked food.

In some demanding applications, a food product such as a ham is sealed inside a plastic processing bag or film in which the ham is cooked, refrigerated, shipped, and subsequently displayed for retail sale.

In a more common demanding application, food such as a turkey breast, ham, or beef is cooked in a pan, net, or processing film from which the cooked food is removed for further processing such as: slicing; smoking in a smokehouse; treatment with colorants and/or flavorants such as caramel, spices, liquid smoke, or honey; glazing; and/or removal of liquid (known as purge) resulting from e.g. the cooking process. Following this further processing, the food product is packaged, often in a printed bag, for shipment and sale. The cooked food is typically placed into a heat sealable, heat shrinkable bag which is then emptied of atmospheric gases by vacuum, heat sealed and subjected to a film shrinking operation usually in a water tank at elevated temperature for a brief period of time to produce a compact attractive package. During these steps that follow cooking and occur prior to packaging for shipment, and sale, the food product surface is subject to environmental contamination, for example, by airborne particles, microbes, and dust. The risk from contamination after packaging may be minimized by surface pasteurizing the encased sealed package, e.g., in a water bath or steam chamber held at elevated temperatures (and optionally at elevated pressures) for a time sufficient to provide the desired degree of protection from microbial contamination and growth. The time, temperature, and pressure of this post-cooking pasteurization step may vary widely.

Significantly, this surface treatment is in addition to the cooking or pasteurization process and follows hermetically sealing the cooked or pasteurized food in a plastic packaging film. In this demanding use, this "post-cooking pasteurization" surface treatment is performed after placing the food into the packaging film that will remain on the pasteurized product through sale to an ultimate customer. Often the films are printed with consumer information and brand identification and frequently at least a portion of the film is clear to allow viewing of the enclosed product. Therefore, optical properties and film appearance are important for consumer appeal and sale.

This "post-pasteurization" film must perform a variety of functions well. It must be puncture resistant and have strong seals at the elevated temperatures encountered in the shrinking operation, and also with the post-cooking pasteurization process. It should also keep tight conformation of the film around the product at refrigeration temperatures with an attractive appearance and act as a good barrier to oxygen, moisture, and environmental contaminates.

One particular problem during heat sealing the film of a package for cook-in or other thermal processing applications is that of excessively high tear propagation strengths. Although the strong heat seals provide protection against unwanted seal failure, such seals also make it difficult for the end user to open the package. Accordingly, there is a need for an improved film for a heat-shrinkable package that includes seals of sufficient peel and shear strength to survive the heat shrinking and cook-in or post-cooking pasteurization shrink forces, yet be readily openable by the end user without the use of a knife or cutting implement, and without uncontrolled or random tearing or rupturing of the packaging materials.

BRIEF SUMMARY

In one embodiment, the heat shrinkable film comprises an inner heat sealing layer, an inner frangible layer, an oxygen barrier layer, an outer frangible layer, and an outer heat sealing layer. The film further comprises an oxygen gas transmission rate of less than about 70 cm$^3$/m$^2$ for a 24 hour period at 1 atmosphere, 0% relative humidity, and 23° C. Additionally, the film further comprises a shrinkage value at 90° C., before being formed into the bag, of at least 10% in the machine direction and at least 10% in the transverse directions. The film and bag may be further defined by such features and properties as shrink force, lap seal peel strength and lap seal shear strength, and a first end seal peel strength. lap seal connects the inner heat sealing layer to the outer heat sealing layer. The lap seal is peelable along a lap seal interface located between the outer heat sealing layer and the outer frangible layer. The lap seal peel strength is about 250 to about 3000 grams per inch. The first end seal connects the inner heat sealing layer with itself. In this embodiment, the first end seal is peelable along a first end seal interface located between the inner heat sealing layer and the inner frangible layer. The first end seal peel strength is about 1400 to about 3000 grams per inch. Additionally, the lap seal shear strength and first end seal peel strength of the film are greater than the shrink force of the film at approximately 73° C.

In another embodiment, the multilayer film described above is formed into a bag having a lap seal defining a flattened tube member having a first end and an opposing second end, a first bag wall and an opposing second bag wall, and a first bag edge and opposing second bag edge each extending between the first end and the second end of the flattened tube member. The cook-in bag further comprises a first end seal connecting the first layer on the first bag wall with the first layer on the second bag wall between the first and second bag edges proximate to the first end of the tube member. Additionally, the cook-in bag may further comprise a second end seal connecting the inner heat sealing layer on the first bag wall with the inner heat sealing layer on the second bag wall between the first and second bag edges proximate to the second end of the tube member. The second end seal has a second end seal peel strength which is greater than the shrink force of the film at approximately 73° C. Also, the second end seal is peelable along a second end seal interface located between the inner heat sealing layer and the inner frangible layer, where the second end seal peel strength is about 1400 to about 3000 grams per inch.

In another embodiment, a multilayer heat-shrinkable film comprises at least five layers arranged in sequence and in contact with one another. The first layer of the film comprises at least 50 wt % of at least one material independently selected from the following: polyethylenes, polypropylenes, ethylene/α-olefin copolymers having at least one $C_3$ to $C_{10}$ α-olefin, propylene/ethylene copolymers, ethylene/vinyl acetate copolymers, polyamides, polyesters, polyvinyl chlorides, ionomers, and mixtures thereof. The film further comprises a second layer comprising approximately 0.1-30 wt % polybutene. The film further comprises a third layer comprising approximately 90-100 wt % of an ethylene vinyl alcohol copolymer having an ethylene content between approximately 38-44 mol %. The film further comprises a fourth layer comprising approximately 0.1-30 wt % polybutene. The film further comprises a fifth layer comprising at least 50 wt % of at least one material independently selected from the following: polyethylenes, polypropylenes, ethylene/α-olefin copolymers having at least one $C_3$ to $C_{10}$ α-olefin, propylene/ethylene copolymers, ethylene/vinyl acetate copolymers, polyamides, polyesters, polyvinyl chlorides, ionomers, and mixtures thereof.

In another embodiment, the multilayer film described above is formed into a bag comprising a lap seal connecting the first layer of the film to the fifth layer, the lap-sealed film defining a flattened tube member having a first end and an opposing second end, a first bag wall and an opposing second bag wall, and a first bag edge and opposing second bag edge each extending between the first end and the second end of the flattened tube member. The bag further comprises a first end seal connecting the first layer on the first bag wall with the first layer on the second bag wall between the first and second bag edges proximate to the first end of the tube member.

In another embodiment, an individual bag comprises a multilayer heat-shrinkable film. The film comprises an inner heat sealing layer, an inner frangible layer, an oxygen barrier layer, an outer frangible layer, and an outer heat sealing layer. The film further comprises an oxygen gas transmission rate of less than about 70 cm$^3$/m$^2$ for a 24 hour period at 1 atmosphere, 0% relative humidity, and 23° C. Additionally, the film further comprises a shrinkage value before being formed into the bag, of at least 10% in both machine and transverse directions at 90° C. The multilayer film is formed into a bag comprising the lap seal defining a flattened tube member having a first end and an opposing second end, a first bag wall and an opposing second bag wall, and a first bag edge and opposing second bag edge each extending between the first end and the second end of the flattened tube member. The bag further comprises a first end seal connecting the first layer on the first bag wall with the first layer on the second bag wall between the first and second bag edges proximate to the first end of the tube member. Additionally, the bag may further comprise a second end seal connecting the inner heat sealing layer on the first bag wall with the inner heat sealing layer on the second bag wall between the first and second bag edges proximate to the second end of the tube member. The second end seal has a second end seal peel strength which is greater than the shrink force of the film at approximately 73° C. Also, the second end seal is peelable along a second end seal interface located between the inner heat sealing layer and the inner frangible layer, where the second end seal peel strength is about 1400 to about 3000 grams per inch. The bag is suitable for use in thermally processing foodstuffs such as meat as a cook-in bag or for post-pasteurization applications.

BRIEF DESCRIPTION OF THE DRAWINGS

The following detailed description of specific embodiments of the present invention can be best understood when read in conjunction with the following drawings, where like structure is indicated with like reference numerals.

FIG. 5 illustrates the relationship between shrink force and temperature.

FIG. 6 illustrates the relationship between shrink force and temperature.

DETAILED DESCRIPTION

For the purposes of promoting an understanding of the principles of the invention, reference will now be made to the embodiments illustrated in the drawings, and specific language will be used to describe the same.

As used herein, terms such as "preferably," "desirably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

As used herein, the term "shrink force" may refer to the force or stress exerted by the film on the contents of a package as the film contracts under heat. A value representative of the shrink force may be obtained using a dynamic mechanical analyzer (DMA) which can measure the forces exerted on the films under tension, such as the "Isostrain Mode" test on a TA Instruments Q800 DMA. The shrink force may be determined by cutting out rectangular specimens from sample films with the long axis parallel to either the machine or the transverse direction. The specimens are clamped at the short ends so that the force to be measured is applied along the long axis. One clamp is stationary, while the other clamps are housed in a small oven whose heating rate can be accurately controlled. The specimen is heated and the force needed to hold the moveable clamp at a fixed distance from the stationary clamp is measured. This force is equal to and opposite the shrink force. Various heating rates can be chosen, resulting in slightly different shrink forces. A heating rate of 5° C./minute was used in the examples below.

As used herein, the term "heat sealing" refers to sealing opposing portions of film (at the lap seal interface or at the end seal interface) with heat. In one preferred embodiment, the heat sealing is conducted with a PW3124 Precision Heat Sealer with a RES-440 Heat Seal Controller by Packworld USA, Nazareth, Pa. The seal width was 0.125 in., at a seal temperature was 180° C., seal pressure of 50 psi, and a seal dwell of 1.0 sec. The cooling temperature was 80° C. with a cooling water flowrate of 0.40 gpm.

As used herein, the term "peel strength" refers to the strength of the heat seal interface when pulling one film apart from a second film at a perpendicular, 90° angle to the heat seal interface. This test can be conducted for both lap seal or end seal interfaces. In one embodiment, the films and heat seals are tested for peel strength by securing one film member immobile in a first clamp. A second clamp is secured to the second film member. The clamp is secured on the same side of the heat seal interface as the immobile first film member. The second clamp is pulled at a perpendicular, 90° angle to the heat seal. The peel strength is measured at ambient conditions (23° C.). The lbs. at break are measured and recorded.

As used herein, the term "shear strength" refers to the strength of the heat seal interface when pulling one film apart from a second film at a parallel, 180° angle to the heat seal interface. In one embodiment, the films and heat seals are tested for shear strength by securing one film member immobile in a first clamp. A second clamp is secured to the second film member. The clamp is secured on the opposite side of the heat seal interface as the immobile first film member. The second clamp is pulled at a parallel, 180° angle to the heat seal. The lbs. at break are measured and recorded. The shear strength may be measured at elevated temperature conditions by placing the film members in a temperature controlled water bath. This test allows for determining the strength of the lap seal and end seals at cook-in or SPP conditions (i.e. upwards of 100° C.).

Several embodiments are well adapted to processing and packaging cook-in or pasteurizable foods, such as packaging cook-in hams. "Cook-in" is the term used to indicate a film or bag in which a foodstuff is pasteurized or cooked. This film or bag is used to hold together, protect and/or form the shape of the foodstuff by a food processor (manufacturer) during the cooking or pasteurization process after which the film may be removed (sometimes termed "sealed" or "stripped"), or may be left on as a protective barrier during shipping, and optionally even left on during retail sale.

Figure 1:
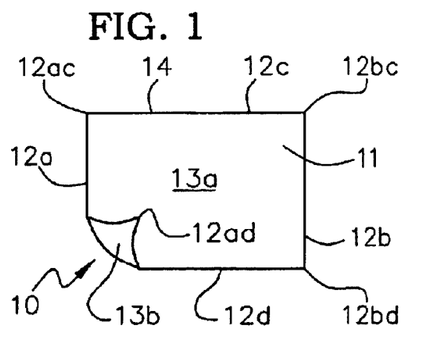
FIG. 1 illustrates a schematic view of a film suitable for making a peelable sealed heat shrink bag.

FIG. 1 depicts an embodiment of a film that is capable of forming a heat-shrinkable, easy open cook-in bag. A sheet 10 of heat shrinkable film 11 having a first side edge 12a and opposing, second side edge 12b connected by a third side edge 12c and a fourth side edge 12d. First side edges 12a and second 12b are preferably parallel to each other when film 11 is in a long flat planar state. Third side edge 12c and fourth side 12d are preferably parallel to each other when film 11 is in a lay flat planar state. First and second side edges 12a, 12b are also preferably perpendicular to third and fourth side edges 12c, 12d when film 11 is in a lay flat planar state. Film 11 has four corners at the intersections of the four sides with first corner 12ac defined by the junction of first side edge 12a with third side edge 12c; second corner 12b defined by the junction of first side edge 12a with third side edge 12c; second corner 12bc defined by the junction of second side edge 12b with third side edge 12c; third corner 12ad defined by the junction of first side edge 12a with fourth side edge 12d; and fourth corner 12bd defined by the junction of second side edge 12b with fourth side edge 12d. Film 11 has a top surface 13a circumscribed by a perimeter 14 formed by sides 12a, 12c, 12b and 12d with an opposing bottom surface 13b also circumscribed by said perimeter 14. FIG. 1 depicts corner 12ad of film 11 turned upward to reveal said bottom surface 13b.

Figure 2:
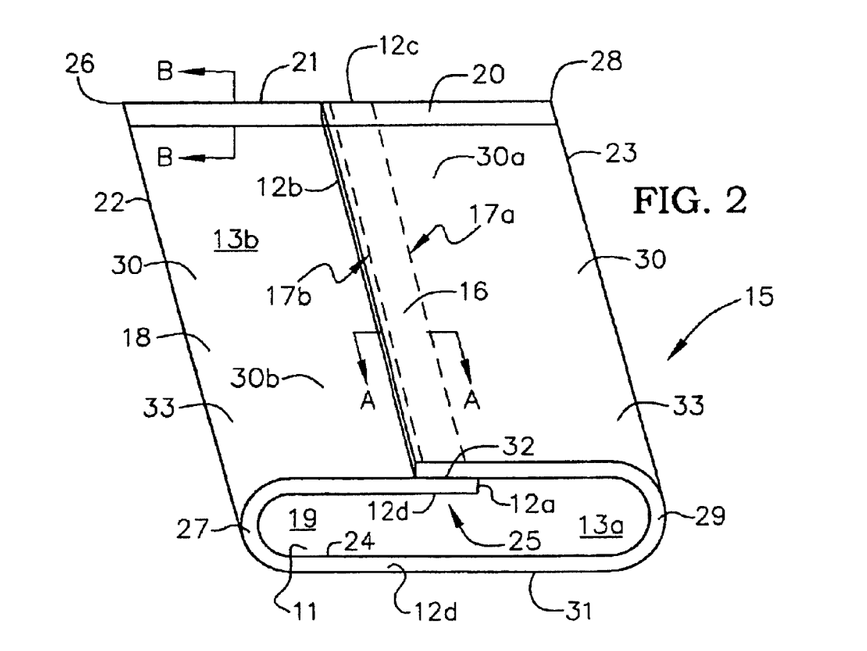
FIG. 2 illustrates a schematic view of a heat-shrinkable bag in a substantially lay-flat position.

Referring now to FIG. 2, a bag 15 is made from the film 11 of FIG. 1. The bag 15 is formed by overlapping the first side edge 12a with the second side edge 12b and sealing preferably by heat to produce a lap seal 16 defined by parallel spaced apart dotted lines 17a and 17b, and third side edge 12c and fourth side edge 12d. It should be noted that while said lap seal 16 is depicted as a continuous elongated rectangle extending from side 12c to side 12d, the invention further contemplates that the seal shape may vary and could, for example, form a wavy line or zigzag shape or other shapes as desired. Also, the width of the seal may be varied to be thicker or thinner as desired. Also the seal may optionally be made by alternatives or additional means, including, e.g., by applications of suitable glue or adhesive material known in the art for sealing together films. The strength of the seal may be varied by one skilled in the art in view of the teachings of the present application by selection of aforesaid parameters such as seal shape, thickness, continuous or intermittent nature, material selection type of and known parameter for varying the strength of different types of seals, e.g., by adjusting dwell time or temperature for producing heat seals. Such variations and adjustments may be made by those skilled in the art without undue experimentation.

Referring again to FIG. 2, lap seal 16 is preferably a heat seal forming a fusion bond between top surface 13a and bottom surface 13b of film 11. The overlapped sealed film 11 defines a tube member 18 in which top surface 13a of film 11 forms an inner film surface 19 of said tube member 18. The lap seal does not need to be centered between edges 22 and 23 but preferably is positioned anywhere therebetween. A first end seal 20 extends laterally across said tube member 18 adjacent the third side edge 12c of film 11 thereby forming a closed bag end 21. A variety of seals may be used. Preferably, the first end seal 20 will be a heat seal that bonds the bag film inner surface 19 to itself. This inner surface to inner surface seal in FIG. 2 defines an embodiment of a "fin seal." The first end seal 20 by closing bag end 21 both forms a first bag edge 22 and opposing second bag edge 23, and the first end seal 20 extends across the tube member 18 from the first bag edge 22 to the second bag edge 23. The first end seal 20 may also employ a variety of shapes, thicknesses, structures, etc. (such as a "fin seal" as depicted in FIG. 2).

Opposite the closed bag end 21 is a bag mouth formed by lap sealed film under fourth side edge 12d through which a product may be placed into a product receiving chamber 25 defined by tube member 18, closed bag end 21 and bag mouth 24. After insertion of the product, the bag is sealed with a second end seal, extending laterally across the tube member 18 adjacent the fourth side edge 12d of film, thereby forming a sealed cook-in bag with inserted product. Like the first end seal 20, the second end seal extends across the tube member 18 from the first bag edge 22 to the second bag edge 23. The second end seal may also employ a variety of shapes, thicknesses, structures, etc. (such as a "fin seal" similar to the first end seal 20 in FIG. 2). The second end seal is preferably a heat seal that bonds the bag film inner surface 19 to itself.

The first bag edge 22 may extend from a first bag end corner 26 to a first bag mouth point 27 and a second bag edge 23 may extend from a second bag end corner 28 to a second bag mouth point 29 such that bag 15 may be collapsed into a lay flat condition having first bag edge 22 and opposing second bag edge 23. In a lay flat condition or a state close to lay flat such as depicted in FIG. 2, bag end 21, bag mouth 24 and connecting first bag edge 22 and second bag edge 23 defines a first bag wall 30 and connected opposing bag wall 31. Tube member 18 has an inner surface 19 and an outer surface 33. The first bag wall 30 has first bag wall first side 30a proximate second side edge 12b and extending to second bag edge 23. The first bag wall 30 also has an opposing first bag wall seamed side 30b proximate first side edge 12a and extending to first bag edge 22.

Preferably, both the top and bottom end seals are provided in a manner such that the lap seal 16 is positioned within one of the first and second bag walls 30 and 31, thereby forming a "backseam" of the bag. This provides one seamless bag wall and two seamless bag edges that may include printed images applied to the film before forming the bag, or after the bag is formed. Additionally, the first and second end seals may take any shape, whether straight or curved, so long as the bottom end seal 20 operates to close the end 21 and the top end seal operates to close the end 24.

The lap seal 16, first end seal 20, and second end seal each comprise a peelable seal. "Peelable seal" and like terminology is used herein to refer to a seal, and especially heat seals, which are engineered to be readily peelable without uncontrolled or random tearing or rupturing the packaging materials which may result in premature destruction of the package and/or inadvertent contamination or spillage of the contents of the package. A peelable seal is one that can be manually peeled apart to open the package at the seal without resort to a knife or other implement to tear or rupture the package. Many varieties of peelable seals are known in the art, such as those disclosed in U.S. Pat. No. 4,944,409 (Busche et al.); U.S. Pat. No. 4,875,587 (Lulham et al.); U.S. Pat. No. 3,655,503 (Stanley et al.); U.S. Pat. No. 4,058,632 (Evans et al.); U.S. Pat. No. 4,252,846 (Romesberg et al.); U.S. Pat. No. 4,615,926 (Hsu et al.) U.S. Pat. No. 4,666,778 (Hwo); U.S. Pat. No. 4,784,885 (Carespodi); U.S. Pat. No. 4,882,229 (Hwo); U.S. Pat. No. 6,476,137 (Longo); U.S. Pat. No. 5,997,968 (Dries, et al.); U.S. Pat. No. 4,189,519 (Ticknor); U.S. Pat. No. 5,547,752 (Yanidis); U.S. Pat. No. 5,128,414 (Hwo); U.S. Pat. No. 5,023,121 (Pockat, et al.); U.S. Pat. No. 4,937,139 (Genske, et al.); U.S. Pat. No. 4,916,190 (Hwo); and U.S. Pat. No. 4,550,141 (Hoh), the disclosures of which are incorporated herein in their entirety by reference thereto.

In certain embodiments, the peelable lap seal must have a shear strength, as defined by the shear strength test below, sufficient to remain sealed and prevent failure of the seal during the normal heat-shrinking process, as well as further normal handling and transport of the packaged article. Additionally, the shear strength of the lap seal must have sufficient strength to remain sealed after being subjected to a typical cook-in or surface post-pasteurization treatment. In other words, the shear strength for the lap seal must remain greater than the shrink forces exerted on the bag at elevated temperatures up to approximately 100° C. Preferably, seal parameters such as choice of film materials and sealing conditions will be used to adjust the shear strength to the desired level for the particular package and application.

Additionally, the peelable end seals must have sufficient peel strength, as defined by the peel strength test below, to remain sealed and prevent failure of the seal during the normal heat-shrinking process, as well as further normal handling and transport of the packaged article. The peel strength of an end seal must have sufficient strength to remain sealed after being subjected to a typical cook-in or surface post-pasteurization treatment. In other words, the peel strength for an end seal must remain greater than the shrink forces exerted on the bag at elevated temperatures up to approximately 100° C. Preferably, seal parameters such as choice of film materials and sealing conditions will be used to adjust the peel strength to the desired level for the particular package and application.

In one embodiment, the lap seal has sufficient shear strength and the end seal has sufficient peel strength to remain sealed after being subjected to a hot water bath for about 6 hours at approximately 73° C. In another embodiment, the lap seal has sufficient shear strength and the end seal has sufficient peel strength to remain sealed after being subjected to a hot water bath for about 6 hours at approximately 85° C. In other embodiment, the lap seal has sufficient shear strength and the end seal has sufficient peel strength to remain sealed after being subjected to a hot water bath for about 8 hours at approximately 73° C. In another embodiment, the lap seal has sufficient shear strength and the end seal has sufficient peel strength to remain sealed after being subjected to a hot water bath for about 8 hours at approximately 85° C. In another embodiment, the lap seal has sufficient shear strength and the end seal has sufficient peel strength to remain sealed after being subjected to a hot water bath for about 5 to 10 minutes at approximately 99° C.

In other words, the shear strength for the lap seal and the peel strength for an end seal (i.e. first end seal and/or second end seal) may be greater than the shrink force applied on the film at a particular temperature. For example, the shear strength for the lap seal and peel strength for both end seals may be greater than the shrink force of the film at approximately 73° C., 85° C., 100° C., or any temperature in between.

In addition, the lap seal, first end seal, and second end seal must be easy to open following the cook-in or surface post pasteurization process. In certain embodiments, the lap seal 16 has a lap seal peel strength, as defined by the peel strength test below, of about 250 grams per inch of material to about 3000 grams per inch. More preferably, the lap seal peel strength is between about 350 and 2000 grams per inch. Even more preferably, the lap seal peel strength is between about 400 and 1000 grams per inch. More preferably, the lap seal peel strength is between 500 and 700 grams per inch.

In certain embodiments, both the first and second end seals have first and second seal peel strengths, respectively, of about 1400 grams per inch of material to about 3000 grams per inch. More preferably, the first and second end seals have peel strengths of about 1400 grams per inch to about 2500 grams per inch. Even more preferably, the first and second end seals have peel strengths between about 1400 and 2000 grams per inch. Also, in preferred embodiments, the lap seal peel strength is less than each of the first and second end seal peel strengths.

Preferred films for use in fabricating the bags may be selected from multilayer, heat-shrinkable films capable of forming the peelable seals. Preferred films may also provide a beneficial combination of one or more or all of the below noted properties including: relatively low permeability to oxygen and water vapor; high delamination resistance and an unexpectedly good combination of delamination resistance especially at elevated temperatures simulating cook-in or post-pasteurization conditions and orientability resulting in good low temperature heat shrinkability; resistance to degradation by food acids, salts and fat; high shrinkage values at low temperatures (90° C. or lower); residual shrink force which forms and maintains a compact product; controllable meat adhesion; good to excellent heat sealability especially over a broad voltage range on commercial sealers; low levels of extractables with compliance with governmental regulations for food contact; low haze; high gloss; does not impart off tastes or odors to packaged food; good tensile strength; a surface which is printable; high puncture resistance (e.g., as measured by the ram and/or hot water puncture tests), high heat shear strength and a long lasting seal especially at cook-in temperatures; and good machinability.

Since cook-in bags may advantageously be used to hold oxygen or moisture sensitive articles such as food products after evacuation and sealing, it is preferred to use a thermoplastic film which includes an oxygen and/or moisture barrier layer. The terms "core," "barrier," or "barrier layer" as used herein mean a layer of the multilayer film which acts as a physical barrier to moisture or oxygen molecules. Advantageous for packaging of oxygen sensitive materials such as fresh red meat, a barrier layer material in conjunction with the other film layers will provide an oxygen gas transmission rate ($O_2$GTR) of less than 70 (preferably 45 or less, more preferably 15 or less) cc per square meter in 24 hours at one atmosphere at a temperature of 73° F. (23° C.) and 0% relative humidity. In an alternative embodiment, the gas permeability is controlled to allow the escape of $CO_2$, e.g., for packaging respiring foods such as cheese as described in U.S. Pat. No. 6,511,688. Preferably, the film has an unrestrained shrinkage of at least 10% (preferably at least 20%, and more preferably at least 30%, and for some applications at least 40%) at 90° C. in at least one, and in certain applications advantageously both, of the machine (MD) and transverse (TD) directions. Unrestrained (sometimes referred to as "free") shrink is measured by cutting a square piece of film measuring 10 cm in each of the machine and transverse directions. The film is immersed in water at 90° C. for five seconds. After removal from the water, the piece is measured and the differences from the original dimensions are each multiplied by ten to obtain the percentage of shrink in each respective direction.

In certain embodiments, the multilayer film useful for a cook-in bag has a film thickness of about 10 mils (254 microns) or less. Preferably, the film thickness is between about 1 and 4 mils (25.4-101.6 microns). More preferably, the film thickness useful for a cook-in bag is between about 2 and 3 mils (50.8-76.2 microns). Such films have good abuse resistance and machinability. Films thinner than 2 mils are less abuse resistant and more difficult to handle in packaging processes.

The multilayer film useful for the inventive bag must have at least five layers. These five essential layers are termed the first layer, the second layer, the third layer, the fourth layer, and the fifth layer. The first layer and fifth layer are disposed on opposing sides of the third layer and are preferably attached thereto by the second and fourth layers, respectively. When the film is in tube or bag form these layers comprise the walls of the tube or bag.

It is contemplated that tubular films having more than five layers may also be constructed and that such additional layers may be disposed as additional intermediate layers lying between the third layer (also called the core or barrier layer) and either or both of the first and fifth layers, or these additional layers may comprise one or more surface layers and comprise either or both the interior or exterior surface of the tube.

Typical layer thicknesses for a five to seven layer heat shrinkable film may be about 5-30% first (typically interior surface) layer, 5-50% second (frangible) layer, 0-30% third (tie, binding layer), 3-13% fourth (barrier) layer, 0-30% fifth (tie, binding) layer, 5-50% sixth (frangible layer), and 1-20% seventh (exterior surface) layer, although films with differing layer ratio thicknesses are possible. In various embodiments, the third and/or fifth tie layers may not be present, creating anywhere between a five and seven layer film structure. Additionally, in other embodiments, more film layers may be present e.g. to produce a 6, 8, 9, 10, 11 or more layer film, potentially altering the typical layer thicknesses.

Figure 3:
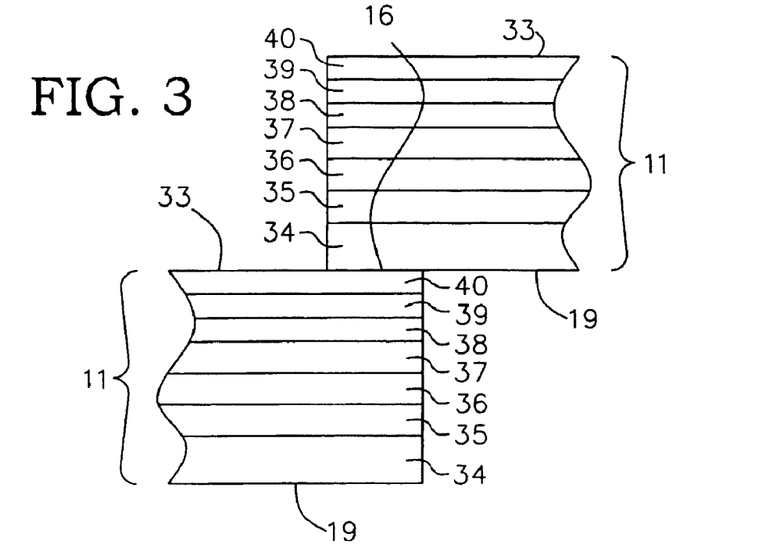
FIG. 3 illustrates a fragmentary cross-sectional view taken along lines A-A of FIG. 2 depicting an enlarged, not to scale, lap seal area of a film for use in fabricating the bag.

One embodiment of a multilayer film structure for use in fabricating inventive bags is illustrated in FIG. 3, which depicts an enlarged, end view of the first seal 16 of FIG. 2 made from the sheet of heat-shrinkable film 11. Layer thicknesses in FIG. 3 and other figures presented herein are not to scale, but are dimensioned for ease of illustration. One embodiment of the easy to peel heat shrinkable film 11 is a seven layer film, from the inner surface 19 of the tube member 19 (see FIG. 2) to an opposing outer surface 33. The layers comprise:
(a) an inner surface heat sealing layer 34,
(b) an inner frangible layer 35,
(c) an inner tie layer 36,
(d) an oxygen barrier layer 37,
(e) an outer tie layer 38,
(f) an outer frangible layer 39, and
(g) an outer surface heat sealing layer 40.

The lap seal 16 is made by longitudinally heat sealing the inner film surface 19 of film 11 to the outer film surface 33 along their respective lengths, such that inner film surface 19 and outer film surface 33 overlap. In this manner, a fusion bond is made between the inner heat sealing layer 34 and the outer heat sealing layer 40. The peelable bond for the lap seal is provided by the outer frangible layer 39 and peeling at the interface with the outer heat sealing layer 40, and/or at the interface with outer tie layer 38 and/or between outer layer 40 and outer tie layer 38.

Figure 4:
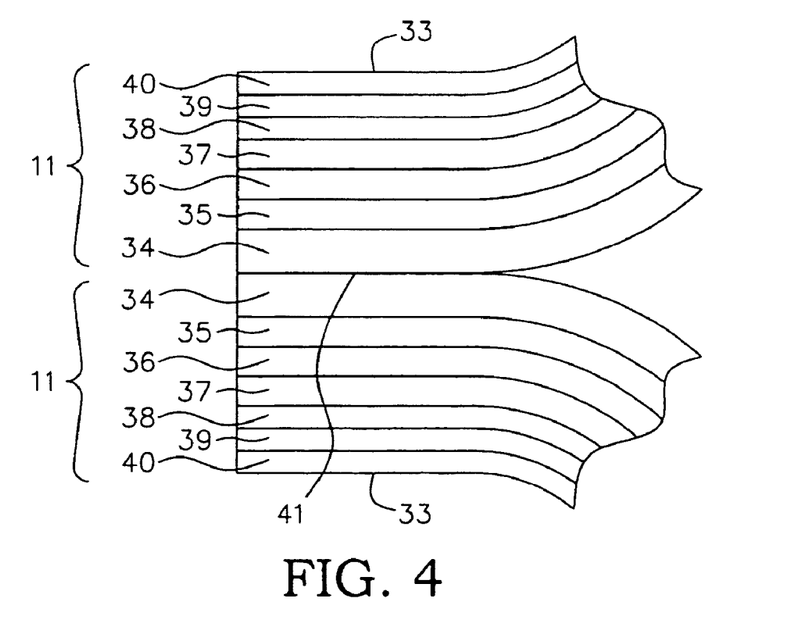
FIG. 4 illustrates a fragmentary cross-sectional view taken along lines B-B of FIG. 2 depicting an enlarged, not to scale, end seal area.

Referring to FIG. 4, a fragmentary sectional view taken along lines B-B of FIG. 2 illustrates how an embodiment works to create easy to open peelable end seals along with the easy to open peelable lap seal in FIG. 3. In FIG. 4, film 11 has an outer surface 33 with consecutive layers therefrom of outer heat sealing layer 40, outer frangible layer 39, outer tie layer 38, barrier layer 37, inner tie layer 36, and inner frangible layer 35, and inner sealing layer 34. Referring to FIG. 2, the second seal 20 is provided across tube member 18 to collapse its surface 19 upon itself. Referring again to FIG. 4, this seal joins inner surface heat sealing layer 34 to itself, creating the end seal interface 41. The peelable bond for the end seal is provided by the inner frangible layer 35 and peeling at the interface with the inner heat sealing layer 34, and/or at the interface with the inner tie layer 36, and/or between the inner layer 34 and the inner tie layer 36.

As mentioned, the inner layer 34 typically comprises the interior surface layer of the tube where in use it will contact a foodstuff encased by the tube. Preferably, the inner layer is a heat sealing layer which allows the film to be formed into bags. By the term "heat sealing layer" is meant a layer which is heat sealable to itself, or sealable to the outer heat sealing layer 40, if a lap seal is desired. A heat sealing layer is capable of fusion bonding by conventional indirect heating means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethrough when exposed to above or below ambient temperatures during processing of food within the tube when sealed at both ends, i.e., in a sealed bag form. For use in cook-in applications, the heat seals should withstand elevated temperatures up to about 160° F.-185° F. (71° C.-85° C.) or higher for extended periods of time, e.g., up to 4 to 12 hours in environments which may range from heated humidified air or steam to submersion in heated water. Additionally, for use in surface, post-pasteurization conditions, the heat seals should withstand elevated temperatures up to about 210° F. (99° C.) for up to about 10 minutes. Finally, the bond interface between contiguous inner layers must have sufficient physical strength to withstand the tension resulting from stretching or shrinking due to the presence of a food body sealed within the tube and optionally subjected to pasteurization or cook-in temperatures and conditions.

Advantageously, the inner layer 34 as the interior surface layer will, when used to package foodstuffs, be suitable for contact with foodstuffs containing protein, water and fat without evolving or imparting harmful materials; off tastes or odors to the foodstuff. In certain embodiments, the inner heat sealing layer may have properties in which there is little to no meat adhesion. In other embodiments, the inner heat sealing layer 34 has controllable meat adhesion properties. The meat adhering attribute of the film may be controlled by the absence, presence, and/or extent of surface energy treatment, e.g., by corona discharge.

The inner layer 34 may comprise at least 50 wt %, more preferably at least 60 wt %, 70 wt %, 80 wt %, or 90 wt %, of one of the following materials: polyethylenes, polypropylenes, ethylene/α-olefin copolymers having at least one $C_3$ to $C_{10}$ α-olefin, propylene/ethylene copolymers, ethylene/vinyl acetate copolymers, polyamides, polyesters, polyvinyl chlorides, and ionomers. In other embodiments, the inner layer is at least about 90 wt %, preferably about 100 wt %, of an anhydride-modified low density polyethylene (AM-LDPE), capable of meat adhesion. One example of an AM-LDPE is AT1000A by Mitsui Chemicals, Tokyo, Japan. This resin has a melting point of 248° F. (120° C.) and a Vicat softening point of 210° F. (99° C.). In another embodiment, the inner layer is at least 90 wt %, preferably 100 wt %, of an ultra-low density polyethylene (ULDPE), useful for a non-meat adhesion cook-in bag. One example of an ULDPE is ATTANE™ 4201G by Dow Chemical Company, Midland, Mich., USA. This polyethylene resin has a density of 0.912 g/cc, a melt index of 1.0 dg/min, a Vicat softening point of 199° F. (93° C.), and a melting point of 253° F. (123° C.).

Also, it is preferred that the multilayer film's outer heat sealing layer 40 will comprise the exterior surface of the tube or bag. As the exterior surface layer of the tube or bag, the outer layer should be resistant to abrasions, abuse, and stresses caused by handling and it should further be easy to machine (i.e. be easy to feed through and be manipulated by machines e.g. for conveying, packaging, printing or as part of the film or bag manufacturing process). It should also facilitate stretch orientation where a high shrinkage film is desired, particularly where shrinkage is to occur at low elevated temperatures such as 90° C. or 85° C. or 80° C. or lower.

In certain embodiments, the outer heat sealing layer 40 is comprised of similar materials present in the inner heat sealing layer, which assists in creating a strong seal along the lap seal interface between the inner and outer film layers. Therefore, the outer heat sealing layer 40 may also comprise at least 50 wt %, more preferably at least 60 wt %, 70 wt %, 80 wt %, or 90 wt %, of one of the following materials: polyethylenes, polypropylenes, ethylene/α-olefin copolymers (EAO) having at least one $C_3$ to $C_{10}$ α-olefin, propylene/ethylene copolymers, ethylene/vinyl acetate copolymers, polyamides, polyesters, polyvinyl chlorides, and ionomers. In other embodiments, the inner layer is at least 90 wt % of an anhydride-modified low density polyethylene (AM-LDPE). In another embodiment, the inner layer is at least about 90 wt % of an ultra-low density polyethylene (ULDPE). In certain embodiments, the outer layer further comprises about 0.1-10 wt %, preferably about 3-5 wt %, of a polyethylene additive, anti-blocking agent. One such agent is Ampacet, grade 10063 by Ampacet, Tarrytown, N. Y., USA. Also, in other embodiments, the outer layer further comprises about 0.1-5 wt %, preferably about 1-3 wt % oleamide in LLDPE.

The polyethylenes and ethylene alpha-olefin copolymer materials described herein have at least 50% of there polymeric units derived from polymerization of ethylene monomer whereas the polypropylene or propylene ethylene copolymers have at least 50% of there polymeric units derived from propylene monomer.

A barrier or core layer 37 is present between the inner and outer heat sealing layers that comprises at least one material independently selected from group consisting of: ethylene vinyl alcohol copolymers (EVOH), polyacrylonitriles, polyamides, vinylidene chloride copolymers (PVDC), polyglycolide copolymers, and mixtures thereof. The barrier layer functions as a controlled gas barrier, and provides the necessary oxygen barrier for preservation of the article to be packaged. The barrier layer 37 should also provide good optical properties when stretch oriented, including low haze and a stretching behavior compatible with the layers around it. It is desirable that the thickness of the barrier layer be greater than about 0.05 mil (1.27 microns) and less than about 0.45 mil (10.16 microns) to provide the desired combination of the performance properties sought, e.g. with respect to oxygen permeability, shrinkage values especially at low temperatures, ease of orientation, delamination resistance, and optical properties. In certain embodiments, the suitable thickness of the barrier layer is less than about 15%, typically about 3-13% of the total film thickness. In certain embodiments, the barrier layer comprises: at least about 90 wt %, preferably about 100 wt %, of an ethylene vinyl alcohol (EVOH) copolymer resin having an ethylene content of about 38-44 mol %. One example is SOARNOL® AT 4403 by Noltex LLC, Arlington Heights, Ill., USA. This EVOH copolymer has an ethylene content of about 44 mol %, a density of 1.14 g/cc, a melt index of 3.50 dg/min (at 210° C./2.16 kg), and a melting point of about 327° F. (164° C.).

An inner frangible layer 35 is positioned between the inner heat sealing layer 34 and the barrier layer 37. The outer frangible layer 39 is positioned between the barrier 37 and the outer heat sealing layer 40. Both frangible layers are selected to have relatively low peel strength when peelably bonded to one of either the outer layer or inner heat seal layer, or additional intermediate layer between the inner/outer layer and frangible layer.

In certain embodiments, the frangible layers are designed to tear within each layer or at each layer's interface with its adjacent layer, making the bag easier to open. The inner frangible film layer is selected such that peeling occurs by breaking apart the inner frangible layer and/or a bond between the inner frangible layer and either adjacent layer e.g. the inner heat sealing layer or barrier layer. The outer frangible film layer 39 is selected such that peeling occurs by breaking apart the outer frangible layer and/or a bond between the outer frangible layer and the outer layer or barrier layer. Peeling within these layers or at their interfaces will occur with a relatively small amount of force in comparison to the force typically required to peel apart two sections of similar film layers that have been heat sealed together. In other words, certain "frangible component" materials within the frangible layer will weaken the film layer, making it easier to peel open the bag along the lap seal interface and the end seal interfaces, allowing easy access to the product. And while the bag will tear open easily at these interfaces, the frangible layers and their materials will provide lap and end strength values that prevent the package from failing during packing, shrinking operations, thermal processing such as cooking or post-pasteurization, shipping, and storage e.g. at refrigeration or freezing temperatures.

Selection of the various materials determines the nature of the bond, i.e., whether it is permanent, peelable, fracturable or combinations thereof. The inner and outer frangible layer materials typically depend on the polymer resin used to make up each frangible layer. In certain embodiments, the frangible layers are comprised of at least one material independently selected from the group consisting of: polybutene, ionomer, styrene butadiene, polyethylene, polypropylene, and mixtures thereof. Also, when the frangible layer primarily comprises a polyethylene polymer, polybutene is a preferred "frangible component" material that may be used to weaken the frangible layer. In certain embodiments, the frangible layers contain 0.1-30 wt % polybutene and at least one other constituent, such as ethylene vinyl acetate copolymer, ethylene copolymers with $C_4$-$C_8$ α-olefin, linear low density polyethylene, ionomers, neutralized ethylene acid copolymer, unneutralized ethylene acid copolymer, and mixtures thereof. The term "polybutene" as used herein includes having polymeric units derived from butene-1 as the major (75% polymeric units) components and preferably at least 80% of its polymeric units will be derived from butene-1. One possible polybutene is a random copolymer of butene-1 with ethylene having a reported density of 0.908 g/cm.sup.3 and a melt index of 1.0 g/10 min. and a melting point of 243° F. (117° C.), which is commercially available from Basell Polyolefins Company, N.V., The Netherlands, under the trade name PB 8640. In this preferred peelable embodiment, the heat seal formed between the inner heat seal layer and another layer to which it is heat sealed, whether part of another film or the same, should be permanent, i.e., should have a seal strength greater than the peelable bond between the tie layer and one of its adjacent layers.

In certain embodiments, the inner and outer frangible layer comprise between about 0.1-30 wt % polybutene, about 40-80 wt % EVA, and about 20-30 wt % mLLDPE. Preferably, the inner frangible layer comprises about 0.1-10 wt % polybutene, and the outer frangible layer comprises about 20-30 wt % polybutene. The copolymer of ethylene and vinyl acetate (EVA) may be PETROTHENE® NA442 by Equistar Chemicals, Houston, Tex., USA. This EVA has 5.0% vinyl acetate content, a melt index of 1.5 dg/min, and a Vicat softening point of 190° F. (88° C.). The ethylene-based hexane copolymer, such as metallocene linear low density polyethylene (mLLDPE) may be EXACT™ 3139 by Exxon Chemical Company, Houston, Tex., USA. This copolymer has a density of 0.90 g/cc, a melt index of 7.5 dg/min, and a melting point of about 203° C. (95° C.).

In certain embodiments, an inner tie layer 36 may be present between the inner frangible layer 35 and the barrier layer 37 to provide assistance in tying the inner frangible layer to the barrier layer. Additionally, an outer tie layer 38 may be located between the outer frangible layer 39 and barrier layer 37 to serve a similar function. The inner and outer tie layers may comprise at least one of the following materials: polyethylenes, polypropylenes, ethylene/α-olefin copolymers having at least one $C_3$ to $C_{10}$ α-olefin, propylene/ethylene copolymers, ethylene/vinyl acetate copolymers, polyamides, polyesters, polyvinyl chlorides, and ionomers.

In certain embodiments, either tie layer may comprise at least one of the following: ethylene vinyl acetate (EVA) copolymers, anhydride-modified ethylene polyolefins, ethylene/α-olefin copolymers, ethylene methyl acrylate (EMA) copolymers, ethylene butyl acrylate (EBA) copolymers, ethylene ethyl acrylate (EEA) copolymers, plastomers, and mixtures thereof.

In certain embodiments, the tie layers comprise about 20-40 wt %, preferably about 30 wt %, of a tie layer resin, such as an anhydride-modified polyolefin like EVA, LDPE, LLDPE, or HDPE. For example, PLEXAR™ PX3080 by Equistar Chemicals is an anhydride modified LLDPE with a density of 0.910 g/cc, melt index of 1.8 dg/min, and a Vicat softening point of about 208° F. (98° C.). These tie layers may further comprise about 20-50 wt %, preferably about 35-40 wt %, of an ethylene-α-olefin copolymer of very low density polyethylene (VLDPE), such as ATTANE™ XU 61509.32 by Dow Chemical, Midland, Mich., USA. This VLDPE is a copolymer of ethylene and 1-octene reportedly having a melt index of about 0.5 dg/min, a density of about 0.912 g/cc, a Vicat softening point of about 203° F. (95° C.), and a melting point of about 252° F. (122° C.). These tie layers may further comprise about 10-20 wt %, preferably about 15 wt %, of a plastomer resin having ethylene and at least one $C_3$-$C_8$ α-olefin, such as EXACT™ SLP 9523 by Exxon Chemicals, Houston, Tex., USA. This plastomer resin has a density of less than 0.9 g/cc and a melting point of less than 185° F. (85° C.). These tie layers may also comprise about 10-30 wt %, preferably about 15-20 wt %, of a copolymer of ethylene and vinyl acetate (EVA), such as ESCORENE LD™ 701 by Exxon Chemical Company. This EVA has 10.5% vinyl acetate content, a density of 0.93 g/cc, a melt index of 0.19 dg/min, and a melting point of about 207° F. (97° C.).

EXAMPLES

Experimental results and reported properties of the following examples and comparative examples are based on the following test methods or substantially similar methods, unless otherwise noted:

Density: ASTM D-792

Tensile Strength: ASTM D-882, Method A

Oxygen Gas Transmission Rate ($O_2$GTR): ASTM D-3985-81

Water Vapor Transmission Rate (WVTR): ASTM F 1249-90

Elmendorf Tear Strength: ASTM D-1992

Melt Index: ASTM D-1238, Condition E (190° C./2.16 kg) (except for propene-based (>50% $C_3$ content) polymers tested at Condition TL (230° C.))

Melting point: ASTM D-3418, DSC with 5° C./min heating rate

Surface Energy (Wetting Tension): ASTM D-2578-84

Vicat Softening Temperature: ASTM D-1525

Shrinkage Values: Shrinkage values are defined to be values obtained by measuring unrestrained shrink of a 10 cm square sample immersed in water at 90° C. (or the indicated temperature if different) for five seconds. Four test specimens are cut from a given sample of the film to be tested. The specimens are cut into squares of 10 cm length in the machine direction by 10 cm length in the transverse direction. Each specimen is completely immersed for 5 seconds in a 90° C. (or the indicated temperature if different) water bath. The specimen is then removed from the bath and the distance between the ends of the shrunken specimen is measured for both the machine (MD) and transverse (TD) directions. The difference in the measured distance for the shrunken specimen and the original 10 cm side is multiplied by ten to obtain the percent of shrinkage for the specimen in each direction. The shrinkage of four specimens is averaged for the MD shrinkage value of the given film sample, and the shrinkage for the four specimens is averaged for the TO shrinkage value. As used herein the term "heat shrinkable film at 90° C." means a film having an unrestrained shrinkage value of at least 10% in at least one direction.

Shrink Force: The shrink force of a film is that force or stress required to prevent shrinkage of the film. Shrink force values are measured by performing the 'Isostrain Mode' test on a TA Instruments Q800 Dynamic Mechanical Analyzer (DMA). The shrink force for the film sample is reported in Newtons per sample. These results are converted into grams/inch for comparison. The shrink force may be determined by cutting out rectangular specimens from sample films with the long axis parallel to either the machine or the transverse direction. The specimens are clamped at the short ends so that the force to be measured is applied along the long axis. One clamp is stationary, while the other clamps are housed in a small oven whose heating rate can be accurately controlled. The specimen is heated and the force needed to hold the moveable clamp at a fixed distance from the stationary clamp is measured. This force is equal to and opposite the shrink force. Various heating rates can be chosen, resulting in slightly different shrink forces. In these examples, a heating rate of 5° C./minute was used.

Heat Sealing: Opposing portions of film (at the lap seal interface or at the end seal interface) are heat sealed using a PW3124 Precision Heat Sealer with a RES-440 Heat Seal Controller by Packworld USA, Nazareth, Pa. The seal width was 0.125 in., at a seal temperature was 180° C., seal pressure of 50 psi, and a seal dwell of 1.0 sec. The cooling temperature was 80° C. with a cooling water flowrate 010.40 gpm.

Peel Strength Test (90° angle to seal): A heat sealed interface is located between two film members for either a lap seal or end seal interface. The films and heat seals are tested for peel strength by securing one film member immobile in a first clamp. A second clamp is secured to the second film member. The second clamp is secured on the same side of the heat seal interface as the first clamp and immobile first film member. The second clamp is pulled at a perpendicular, 90° angle to the heat seal. The peel strength is measured at ambient conditions (23° C.). The lbs. at break are measured and recorded.

Shear Strength Test (180° angle to seal): A heat sealed interface is located between two film members. The films and heat seals are tested for shear strength by securing one film member immobile in a first clamp. A second clamp is secured to the second film member. The clamp is secured on the opposite side of the heat seal interface as the immobile first film member. The second clamp is pulled at a parallel, 180° angle to the heat seal. The lbs. at break are measured and recorded. The shear strength may be measured at elevated temperature conditions by placing the film members in a water bath. This test allows for determining the strength of the lap seal and end seals at cook-in or SPP conditions (i.e. upwards of 100° C.).

Following are comparative examples and examples given to illustrate embodiments of the invention.

Comparative Example

The following comparative example is a heat shrinkable film comprising seven layers. The first and seventh layers are the inner and outer layers of the film, both comprising 68.5 wt % Suryln resin ($C_3C_2$), 4 wt % Ionomer, 2.5 wt % Surlyn Slip Concentrate, and 25 wt % EAA resin. The second layer is a first inner tie layer comprising 51 wt % VLDPE, 45 wt % Plastomer, and 4 wt % stabilizers. The third layer is a second inner tie layer comprising 100 wt % EMA. The fourth layer is an oxygen barrier layer comprising 100 wt % PVDC. The fifth layer is an outer tie layer comprising 100% EMA. The sixth layer is a peelable layer comprising 60 wt % EVA, 15 wt % polybutene, and 25 wt % mLLDPE.

Figure 5:
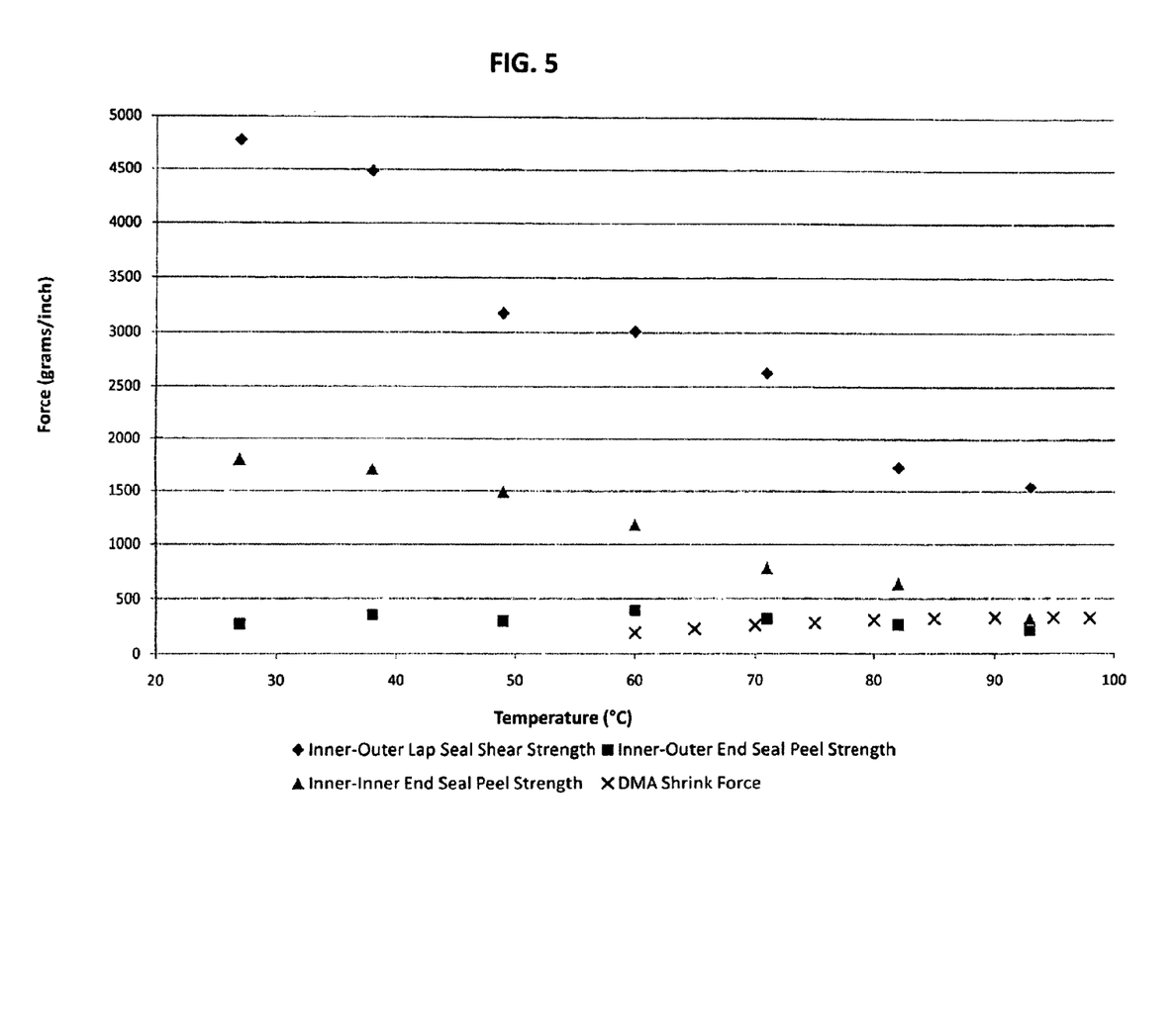
FIG. 5 illustrates the relationship between the lap seal shear strength, end seal peel strength, and temperature along the various seal interfaces for a comparative example. Additionally.

The peel and shear strength of the film from the Comparative Example was tested along the various interfaces at various temperatures. Additionally, the shrink force of the film was measured at various temperatures as measured by the Isostrain Mode Test on a TA Instruments Q800 Dynamic Mechanical Analyzer (DMA). FIG. 5 displays the results of those tests.

Three different seal interfaces were evaluated for peel or shear strength. The seal interfaces were: (1) the inner film layer heat sealed to the outer film layer in a lap seal configuration (tested for shear strength), (2) the inner film layer heat sealed to itself in an end (fin) seal configuration (tested for peel strength), and (3) the inner film layer heat sealed to the outer film layer in an end (fin) seal configuration (tested for peel strength). The inner-outer lap seal interface can be compared to the longitudinal seam of the bag shown in FIGS. 2 and 3. The inner-inner end (fin) seal interface can be compared to the end seal shown in FIGS. 2 and 4.

Each seal configuration was heat sealed under similar conditions using a PW3124 Precision Heat Sealer with RES-440 Heat Seal Controller by Packworld USA, Nazareth, Pa. The seal width was 0.125 in., at a seal temperature was 180° C., seal pressure of 50 psi, and a seal dwell of 1.0 sec. The cooling temperature was 80° C. with a cooling water flowrate of 0.40 gpm.

Each seal configuration was then placed in a heated water bath and allowed to equilibrate to temperature. The peel strengths of the end seals and shear strength of the lap seal were tested at various temperatures as the seals were pulled apart, and the force was measured.

As seen in FIG. 5, the peel and shear strengths of the seal configurations weaken as the water bath temperature increases. Additionally, the shrink force of the multilayer film increases with temperature. It is generally assumed that the lap seal will fail at a given temperature if its shear strength is less than the shrink force of the film at that temperature. It is also assumed that the end seals will fail at a given temperature if their peel strengths are less than the shrink force of the film at that temperature. Based upon the data collected, the shrink force applied to the film was always lower than the shear strength of the inner-outer lap seal at temperatures upwards of 100° C. Therefore, the inner-outer lap seal should not fail under typical cook-in or SPP conditions of up to 100° C.

Regarding the inner-outer end seal, the seal will fail around 75° C. At this point, the shrink force applied to the film becomes greater than the peel strength of the inner-outer end seal. Therefore, this seal would not be suitable for a cook-in or SPP application.

The inner-inner end seal is a non-peelable seal based upon the materials used in the multilayer film. Yet, it also will fail around 91° C. At this point, the shrink force applied to the film is greater than the strength of the seal. Therefore, this seal and its materials would not be suitable for a higher temperature SPP application.

Example 1

In this example, a heat shrinkable multilayer film comprising six layers is produced and formed into a cook-in bag. The first, inner layer is 100 wt % anhydride-modified low density polyethylene (AM-LDPE), capable of meat adhesion. One example of an AM-LDPE is AT1000A by Mitsui Chemicals, Tokyo, Japan. This resin has a melting point of 248° F. (120° C.) and a Vicat softening point of 210° F. (99° C.).

The second and fourth layers are tie layers having 37.5 wt % of an ethylene-α-olefin copolymer of very low density polyethylene (VLDPE), such as ATTANE™ XU 61509.32 by Dow Chemical, Midland, Mich., USA. This VLDPE is a copolymer of ethylene and 1-octene reportedly having a melt index of about 0.5 dg/min, a density of about 0.912 g/cc, a Vicat softening point of about 203° F. (95° C.), and a melting point of about 252° F. (122° C.). These tie layers further comprise 15 wt % plastomer resin having ethylene and at least one $C_3$-$C_8$ α-olefin having a density of less than 0.9 g/cc and a melting point of less than 185° F. (85° C.), such as EXACT™ SLP 9523 by Exxon Chemicals, Houston, Tex., USA. These tie layers also have 17.5 wt % of a copolymer of ethylene and vinyl acetate (EVA), such as ESCORENE LD™ 701 by Exxon Chemical Company. This EVA has 10.5 wt % vinyl acetate content, a density of 0.93 g/cc, a melt index of 0.19 dg/min, and a melting point of about 207° F. (97° C.). These tie layers further comprise 30 wt % of a tie layer resin, such as an anhydride-modified polyolefin like EVA, LDPE, LLDPE, or HDPE. For example, PLEXAR™ PX3080 by Equistar Chemicals is an anhydride modified LLDPE with a density of 0.910 g/cc, melt index of 1.8 dg/min, and a Vicat softening point of about 208° F. (98° C.).

The third layer is a barrier layer that comprises 100 wt % ethylene vinyl alcohol (EVOH) copolymer resin, such as SOARNOL® AT 4403 by Noltex LLC, Arlington Heights, Ill., USA. This EVOH copolymer has an ethylene content of about 44 mol %, a density of 1.14 g/cc, a melt index of 3.50 dg/min (at 210° C./2.16 kg), and a melting point of about 327° F. (164° C.).

The fifth layer is an outer frangible layer comprising 45 wt % of a copolymer of ethylene and vinyl acetate (EVA), such as PETROTHENE® NA442 by Equistar Chemicals, Houston, Tex., USA. This EVA has 5.0% vinyl acetate content, a melt index of 1.5 dg/min, and a Vicat softening point of 190° F. (88° C.). The outer frangible layer further comprises 25 wt % of an ethylene-based hexane copolymer, such as metallocene linear low density polyethylene (mLLDPE). EXACT™ 3139 by Exxon Chemical Company, Houston, Tex., USA, is an example of an mLLDPE. This copolymer has a density of 0.90 g/cc, a melt index of 7.5 dg/min, and a melting point of about 203° C. (95° C.). The outer frangible layer further comprises 30 wt % polybutene, such as PB 8640M from Lyondell Chemical Company, Houston, Tex., USA. This copolymer has a density of 0.906 g/cc, a melt index of 1 dg/min, and a melting point of about 207° F. (97° C.).

The sixth, outer layer is 100 wt % anhydride-modified low density polyethylene (AM-LDPE), such as AT1000A by Mitsui Chemicals, Tokyo, Japan. The outer layer is similar to the first, inner layer, allowing for a strong lap seal to be created between the two layers.

The resins for each film layer were coextruded at a first, second, third, fourth, fifth, and sixth layer outlet thickness ratio of about 14.7:34.3:9.8:8.6:9.8:18.7:3.9. For each layer, the resin or resin mixture is fed from a hopper into an attached single screw extruder where the resin and/or resin mixture is heat plastified and extruded through a spiral plate die into a primary tube. The extruded multilayer primary tube is cooled with cold tap water and flattened with a pair of nip rollers. The cooled, flattened primary tube is reheated, biaxially stretched, and cooled again.

Examples 2-8

In these examples, the heat shrinkable multilayer film comprises seven film layers prepared in a similar fashion as Example 1. The first, inner layer comprises a similar material in a similar amount to the inner layer described in Example 1. As mentioned, this type of AM-LDPE is capable of meat adhesion.

The second layer is an inner frangible layer comprising the same types of materials (EVA, PB, and mLLDPE) seen in the frangible layer described in Example 1. Examples 2-7 use varying amounts of polybutene (PB) within the inner frangible layer, ranging from 5 wt % to 30 wt %.

The third and fifth layers are tie layers, used to assist in binding the frangible layers to the barrier layer. The tie layers comprise similar materials in similar amounts to the tie layers described in Example 1.

The sixth layer is an outer frangible layer comprising the same types of materials seen in the frangible layer described in Example 1. Examples 2-8 use varying amounts of polybutene (PB) within the outer frangible layer, ranging from 25 wt % to 30 wt %.

The seventh, outer layer comprises a similar material to the outer layer described in Example 1. Examples 2-8 use varying amount of an anhydride-modified low density polyethylene, ranging from 94-100 wt %. In Examples 2-6 and Example 8, the outer layer further comprises 4 wt % of a polyethylene additive, antiblocking agent is also present. One such agent is Ampacet, grade 10063 by Ampacet, Tarrytown, N.Y., USA. Also, in Example 8, the outer layer further comprises 2 wt % oleamide in LLDPE.

For Examples 2-6, the resins for each film layer were coextruded at a first, second, third, fourth, fifth, sixth, and seventh layer outlet thickness ratio of about 14.9:28.4:9.8:8.6:9.8:24.5:4. For Example 7, the resins for each film layer were coextruded at a first, second, third, fourth, fifth, sixth, and seventh layer outlet thickness ratio of about 14.7:34.3:9.8:8.6:9.8:18.7:3.9. For example 8, the resins for each film layer were coextruded at a first, second, third, fourth, fifth, sixth, and seventh layer outlet thickness ratio of about 14.9:28.6:9.7:8.7:9.7:24.6:3.9.

Example 9

In this example, the heat shrinkable multilayer film comprises seven film layers prepared in a similar fashion as Example 1. The first, inner layer is 100 wt % ultra-low density polyethylene (ULDPE), useful for a non-meat adhesion cook-in bag. One example of an ULDPE is ATTANE™ 4201G by Dow Chemical Company, Midland, Mich., USA. This polyethylene resin has a density of 0.912 g/cc, a melt index of 1.0 dg/min, a Vicat softening point of 199° F. (93° C.), and a melting point of 253° F. (123° C.).

The second layer is an inner frangible layer comprising the same types of materials (EVA, PB, and mLLDPE) seen in the frangible layers described in Examples 1-8. Varying amounts of polybutene (PB) within the inner frangible are possible. In this example, there is 5 wt % PB is present.

The third and fifth layers are tie layers, used to assist in binding the frangible layers to the barrier layer. The tie layers comprise similar materials in similar amounts to the tie layers described in Example 1-8.

The sixth layer is an outer frangible layer comprising the same types of materials seen in the frangible layer described in Example 1-8. In this example, there is 30 wt % polybutene present.

The seventh, outer layer comprises 94 wt % ultra-low density polyethylene. The outer layer is similar to the first, inner layer, allowing for a strong lap seal to be created between the two layers. The outer layer further comprises 4 wt % of a polyethylene additive, antiblocking agent is also present. One such agent is Ampacet, grade 10063 by Ampacet, Tarrytown, N.Y., USA. Additionally, the outer layer further comprises 2 wt % oleamide in LLDPE.

For example 9, the resins for each film layer were coextruded at a first, second, third, fourth, fifth, sixth, and seventh layer outlet thickness ratio of about 14.7:19.7:9.8:8.7:19.6:23.7:3.8.

Layer formulations of Examples 1-9 are reported below in Table 1.

TABLE 1

| Ex. # | First Inner Layer | Second Contam. Layer | Third Tie Layer | Fourth Barrier Layer | Fifth Tie Layer | Sixth Contam. Layer | Seventh Outer Layer |
|---|---|---|---|---|---|---|---|
| 1 | 100% AM-LDPE | N/A | 37.5% VLDPE<br>30% AM-LLDPE<br>17.5% EVA<br>15% Plastomer | 100% EVOH | 37.5% VLDPE<br>30% AM-LLDPE<br>17.5% EVA<br>15% Plastomer | 45% EVA<br>30% PB<br>25% mLLDPE | 100% AM-LDPE |
| 2 | Same as Ex. 1 | 70% EVA<br>5% PB<br>25% mLLDPE | Same as Ex. 1 | Same as Ex. 1 | Same as Ex. 1 | 50% EVA<br>25% PB<br>25% mLLDPE | 96% AM-LDPE<br>4% PE additive |
| 3 | Same as Ex. 1 | 67.5% EVA<br>7.5% PB<br>25% mLLDPE | Same as Ex. 1 | Same as Ex. 1 | Same as Ex. 1 | Same as Ex. 2 | Same as Ex. 2 |
| 4 | Same as Ex. 1 | 65% EVA<br>10% PB<br>25% mLLDPE | Same as Ex. 1 | Same as Ex. 1 | Same as Ex. 1 | Same as Ex. 2 | Same as Ex. 2 |
| 5 | Same as Ex. 1 | 60% EVA<br>15% PB<br>25% mLLDPE | Same as Ex. 1 | Same as Ex. 1 | Same as Ex. 1 | Same as Ex. 2 | Same as Ex. 2 |
| 6 | Same as Ex. 1 | 50% EVA<br>25% PB<br>25% mLLDPE | Same as Ex. 1 | Same as Ex. 1 | Same as Ex. 1 | Same as Ex. 2 | Same as Ex. 2 |
| 7 | Same as Ex. 1 | 45% EVA<br>30% PB<br>25% mLLDPE | Same as Ex. 1 | Same as Ex. 1 | Same as Ex. 1 | Same as Ex. 1 | Same as Ex. 1 |
| 8 | Same as Ex. 1 | 70% EVA<br>5% PB<br>25% mLLDPE | Same as Ex. 1 | Same as Ex. 1 | Same as Ex. 1 | Same as Ex. 2 | 94% AM-LDPE<br>4% PE additive<br>2% oleamide |

TABLE 1-continued

| Ex. # | First Inner Layer | Second Contam. Layer | Third Tie Layer | Fourth Barrier Layer | Fifth Tie Layer | Sixth Contam. Layer | Seventh Outer Layer |
|---|---|---|---|---|---|---|---|
| 9 | 100% ULDPE | 70% EVA 5% PB 25% mLLDPE | Same as Ex. 1 | Same as Ex. 1 | Same as Ex. 1 | Same as Ex. 1 | 94% ULDPE 4% PE additive 2% oleamide |

Examples 1-7 have been tested for end peel strength and cook-in success, shown below in Table 2.

TABLE 2

| Ex. # | Average End Peel Strength (g/in) | Successful cook-in at 73° C. |
|---|---|---|
| 1 | 3570 | Yes |
| 2 | 1968 | Yes |
| 3 | 1450 | Yes |
| 4 | 1160 | No |
| 5 | 1210 | No |
| 6 | 1310 | No |
| 7 | 1299 | No |

The results from Table 2 show a correlation between the end peel strength and the ability to hold up to typical cook-in bag conditions. Examples 1-7 were placed in a water bath at 165° F. (73° C.) for 6 hours and visually inspected. Success and failure were determined by whether the bag contained or did not contain the product after cook-in was completed. When the end peel strength was greater than approximately 1400 grams per inch, the bag retained the product and did not have an end seal failure during cooking. Therefore, it is preferable to have a cook-in bag with first and second end peel strengths of greater than about 1400 grams-force per inch. Also, it is preferable to have end seals that are easy to open. Therefore, it is also preferable to have first and second end peel strengths of less than about 3000 grams-force per inch.

Additionally, the results from Tables 1 and 2 show a correlation between the inner frangible layer materials and the average end peel strength. Varying the amount of polybutene in the EVA/PB/mLLDPE frangible layer mixture had a noticeable correlation with end peel strength. Increasing the amount of the polybutene frangible component in the frangible layer resulted in a decrease in the peel strength. Eventually, the increased amount of frangible component resulted in seal failure during cook-in conditions. End seal failures during cook-in conditions for Examples 4-7, each containing at least 10 wt % polybutene in the inner frangible layer. Therefore, in certain embodiments, it is preferable to have less than 10% polybutene in the inner frangible layer when using these film materials. Additionally, since it is preferred to have end seals that are easy to open, it is preferable to have some level of "frangible component" in the inner frangible layer to weaken the peel strength. In certain embodiments, it is preferable to have greater than 0.1% polybutene in the inner frangible layer when using these film materials.

Figure 6:
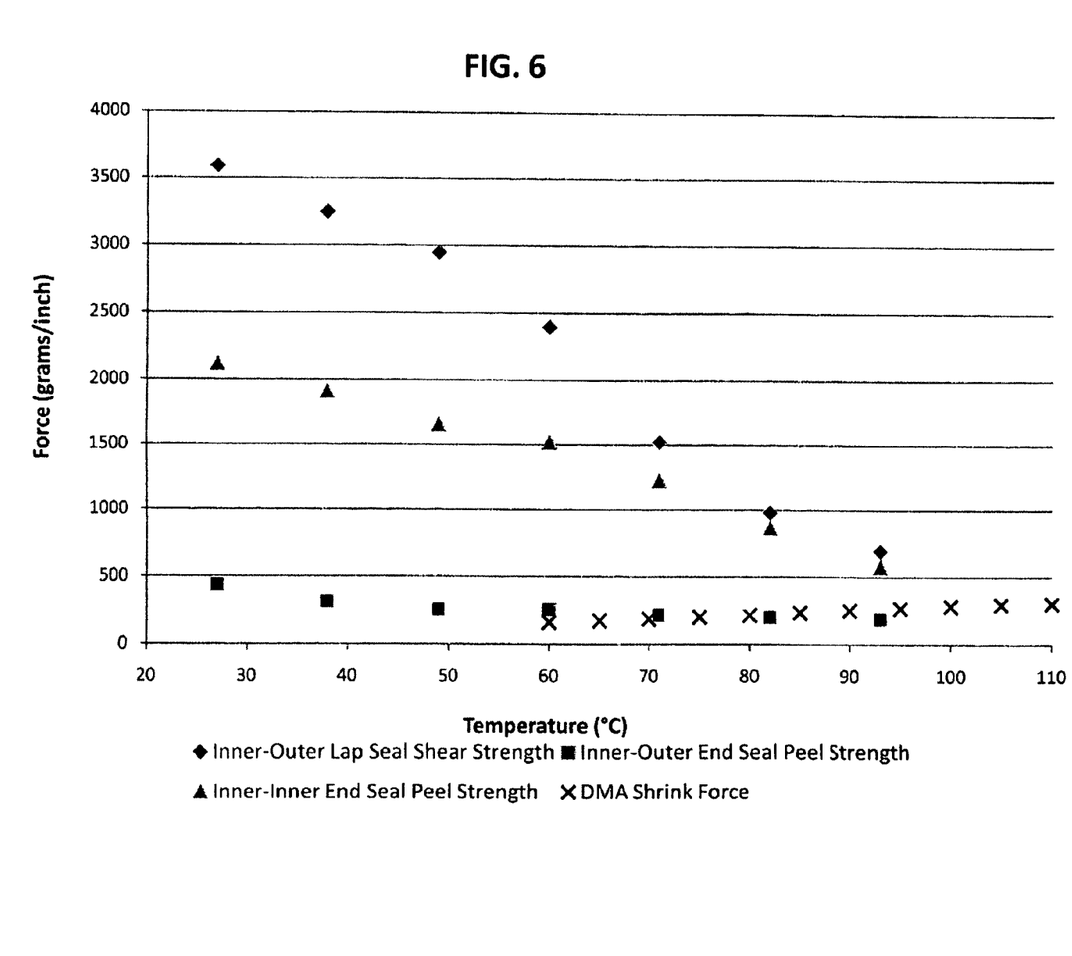
FIG. 6 illustrates the relationship between the lap seal shear strength, end seal peel strength, and temperature along the various seal interfaces for one particular embodiment. Additionally.

Similar to the Comparative Example, the shear strength of the film from Example 8 was also tested along the same interfaces at similar temperatures. Additionally, the shrink force of the film was measured at various temperatures as measured by DMA. FIG. 6 displays the results of those tests.

The three seal interfaces evaluated for peel or shear strength were: (1) the inner film layer heat sealed to the outer film layer in a lap seal configuration (tested for shear strength), (2) the inner film layer heat sealed to itself in an end (fin) seal configuration (tested for peel strength), and (3) the inner film layer heat sealed to the outer film layer in an end (fin) seal configuration (tested for peel strength). The inner-outer lap seal interface can be compared to the longitudinal seam of the bag shown in FIGS. 2 and 3. The inner-inner end (fin) seal interface can be compared to the end seal shown in FIGS. 2 and 4.

Each seal configuration was heat sealed and tested under similar conditions, as previously described for FIG. 5.

As seen in FIG. 6, the peel and shear strengths of the seal configurations weaken as the water bath temperature increases. Additionally, the shrink force of the multilayer film increases with temperature. Based upon the data collected, the shrink force applied to the film was always lower than the shear strength of the inner-outer lap seal at temperatures upwards of 100° C. Therefore, the inner-outer lap seal should not fail under typical cook-in or SPP conditions of up to 100° C.

Regarding the inner-outer end (fin) seal, the seal will fail around 75-80° C. At this point, the shrink force applied to the film becomes greater than the peel strength of the inner-outer end seal. Therefore, this type of seal would not be suitable for a cook-in or SPP application.

The inner-inner end (fin) seal represents a peelable end seal based upon the materials used in the multilayer film, unlike the Comparative Example. Based upon the data collected, the shrink force applied to the film was always lower than the peel strength of the inner-inner end seal at temperatures upwards of 100° C. Therefore, the inner-inner end seal is capable of typical cook-in or SPP conditions of up to 100° C.

In other words, the inner-inner end (fin) seal and inner-outer lap seal configurations in Example 8 allow for an easy to open lap seal and end seals in cook-in, SPP applications, in contrast to the Comparative Example.

Example 9 displays one specific embodiment that has been tested in various cook-in conditions. This particular example is for a non-meat adhering cook-in, SPP bag. Table 3 shows the test results for Example 9 below.

TABLE 3

| Application | Temp (deg F.) | Time Exposed | Successful cook-in? |
|---|---|---|---|
| Cook-in | 165 | 6 hrs | Yes |
| Cook-in | 185 | 8 hrs | Yes |
| Cook-in | 185 | 8 hrs | Yes |
| SPP | 210 | 5 min | Yes |
| SPP | 210 | 10 min | Yes |

The results in Table 3 demonstrate that the film materials in Example 9 were successful in various cook-in and SPP conditions ranging from 6 hours at 165° F. to 8 hours at 185° F. to 10 minutes at 210° F. Success and failure were determined by whether the bag contained or did not contain the product after the cook-in or SPP was completed. Therefore, the materials used in the seven layer film represent one preferred embodiment for a cook-in bag with non-meat adhesion properties.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention. It is therefore intended that the foregoing detailed description be regarded as illustrative rather than limiting, and that it be understood that it is the following claims, including all equivalents, that are intended to define the spirit and scope of this invention.

What is claimed is:

1. A multilayer heat-shrinkable film for forming a bag suitable for thermal processing, the film comprising:
   (a) an inner heat sealing layer,
   (b) an outer heat sealing layer,
   (c) an oxygen barrier layer positioned between the inner heat sealing layer and outer heat sealing layer,
   (d) an inner frangible layer positioned between the inner heat sealing layer and the oxygen barrier layer, and
   (e) an outer frangible layer positioned between the outer heat sealing layer and the oxygen barrier layer;
   wherein the film has an oxygen gas transmission rate of less than about 70 $cm^3/m^2$ for a 24 hour period at 1 atmosphere, 0% relative humidity, and 23° C.;
   wherein the film has a shrinkage value of at least 10% in both machine and transverse directions at 90° C.;
   wherein the film is defined by a shrink force, a lap seal having a lap seal peel strength and a lap seal shear strength, and a first end seal having a first end seal peel strength, where the lap seal connects the inner heat sealing layer and the outer heat sealing layer, and the first end seal connects the inner heat sealing layer with itself;
   wherein both the lap seal shear strength and the first end seal peel strength are greater than the shrink force of the film at approximately 73° C.;
   wherein the lap seal is peelable along a lap seal interface located between the outer heat sealing layer and the outer frangible layer, where the lap seal has a lap seal peel strength of about 250 to about 3000 grams per inch; and
   wherein the first end seal is peelable along a first end seal interface located between the inner heat sealing layer and the inner frangible layer, where the first end seal peel strength is about 1400 to about 3000 grams per inch.

2. The film, as defined in claim 1, wherein the lap seal peel strength is less than the first end peel strength.

3. The film, as defined in claim 1, wherein the lap seal peel strength is about 350 to about 2000 grams per inch.

4. The film, as defined in claim 1, wherein the lap seal peel strength is about 500 to about 700 grams per inch.

5. The film, as defined in claim 1, wherein the first end seal peel strength is about 1400 to about 2000 grams per inch.

6. The film, as defined in claim 1, wherein both the lap seal shear strength and first end seal peel strength are greater than the shrink force of the film at approximately 85° C.

7. The film, as defined in claim 1, wherein both the lap seal shear strength and first end seal peel strength are greater than the shrink force of the film at approximately 99° C.

8. The film, as defined in claim 1, wherein the oxygen gas transmission rate is less than about 15 $cm^3/m^2$ for a 24 hour period at 1 atmosphere, 0% relative humidity, and 23° C.

9. The film, as defined in claim 1, wherein the barrier layer comprises at least one material independently selected from group consisting of: ethylene vinyl alcohol copolymers (EVOH), polyacrylonitriles, polyamides, vinylidene chloride copolymers (PVDC) polyglycolide copolymers, and mixtures thereof.

10. The film, as defined in claim 1, wherein the inner and outer frangible layers each comprise at least one material independently selected from the group consisting of: polybutene, ionomer, styrene butadiene, polypropylene, and mixtures thereof.

11. The film, as defined in claim 1, wherein the inner and outer heat sealing layers each comprise at least one material independently selected from the group consisting of: polyethylenes, polypropylenes, ethylene/α-olefin copolymers having at least one $C_3$ to $C_{10}$ α-olefin, propylene/ethylene copolymers, ethylene/vinyl acetate copolymers, polyamides, polyesters, polyvinyl chlorides, and ionomers.

12. The film, as defined in claim 1, further comprising at least one additional film layer located in a first position between the inner heat sealing layer and the oxygen barrier layer or in a second position between the outer heat sealing layer and the oxygen barrier layer, wherein the at least one additional film layer comprises at least one material independently selected from the group consisting of: ethylene vinyl acetate (EVA) copolymers, anhydride-modified ethylene polyolefins, ethylene/α-olefin copolymers, ethylene methyl acrylate (EMA) copolymers, ethylene butyl acrylate (EBA) copolymers, ethylene ethyl acrylate (EEA) copolymers, plastomers, and mixtures thereof.

13. The film, as defined in claim 1, wherein the film is formed into a bag defined by:
   the lap seal defining a flattened tube member having a first end and an opposing second end, a first bag wall and an opposing second bag wall, and a first bag edge and opposing second bag edge each extending between the first end and the second end of the flattened tube member; and
   the first end seal connecting the inner heat sealing layer on the first bag wall with the inner heat sealing layer on the second bag wall between the first and second bag edges proximate to the first end of the tube member.

14. The film, as defined in claim 13, further comprising a second end seal connecting the inner heat sealing layer on the first bag wall with the inner heat sealing layer on the second bag wall between the first and second bag edges proximate to the second end of the tube member;
   wherein the second end seal has a second end seal peel strength, where the second end seal peel strength is greater than the shrink force of the film at approximately 73° C.; and
   wherein the second end seal is peelable along a second end seal interface located between the inner heat sealing layer and the inner frangible layer, where the second end seal peel strength is about 1400 to about 3000 grams per inch.

15. The film, as defined in claim 14, wherein the lap seal peel strength less than both the first end seal peel strength and the second end seal peel strength.

16. The film, as defined in claim 1, wherein the inner and outer frangible layers each comprise polybutene.

17. The film, as defined in claim 16, wherein the inner frangible layer comprises between 0.1 and 10 wt % polybutene.

18. The film, as defined in claim 16, wherein the outer frangible layer comprises between 20 and 30 wt % polybutene.

19. The film, as defined in claim 18, wherein the inner heat sealing layer comprises an anhydride-modified low density polyethylene having meat adhesion properties.

20. The film, as defined in claim 1, further comprising a first film layer located between the inner heat sealing layer and the oxygen barrier layer and a second film layer located between the outer heat sealing layer and the oxygen barrier layer, wherein each of the first and second film layers comprises at least one material independently selected from the group consisting of: ethylene vinyl acetate (EVA) copolymers, anhydride-modified ethylene polyolefins, ethylene/α-olefin copolymers, ethylene methyl acrylate (EMA) copolymers, ethylene butyl acrylate (EBA) copolymers, ethylene ethyl acrylate (EEA) copolymers, plastomers, and mixtures thereof.

21. The film, as defined in claim 20, wherein the film is formed into a bag defined by:
a lap seal connecting the first layer to the fifth layer, the lap-sealed film defining a flattened tube member having a first end and an opposing second end, a first bag wall and an opposing second bag wall, and a first bag edge and opposing second bag edge each extending between the first end and the second end of the flattened tube member; and
a first end seal connecting the inner layer on the first bag wall with the inner layer on the second bag wall between the first and second bag edges proximate to the first end of the tube member.

22. The film, as defined in claim 20, wherein the first and fifth layers each comprise at least approximately 90 wt % of an anhydride-modified low density polyethylene.

23. The film, as defined in claim 20, wherein the first and fifth layers each comprise at least approximately 90 wt % of an ultra-low density polyethylene.

24. The film, as defined in claim 20, wherein the second layer comprises approximately 0.1-10 wt % polybutene.

25. The film, as defined in claim 20, wherein the fourth layer comprises approximately 20-30 wt % polybutene.

26. The film, as defined in claim 20, further comprising at least one additional film layer located in a first position between the first layer and the third layer or in a second position between the third and the fifth layer, wherein the at least one additional film layer comprises at least one material independently selected from the group consisting of: ethylene vinyl acetate (EVA) copolymers, anhydride-modified ethylene polyolefins, ethylene/α-olefin copolymers, plastomers, and mixtures thereof.

27. The film, as defined in claim 20, further comprising a first film layer located between the second layer and third layer and a second film layer located between the third layer and the fourth layer, wherein each of the first and second film layers comprises at least one material independently selected from the group consisting of: ethylene vinyl acetate (EVA) copolymers, anhydride-modified ethylene polyolefins, ethylene/α-olefin copolymers, plastomers, and mixtures thereof.

28. A multilayer heat-shrinkable film for forming a cook-in bag, the film comprising:
at least five layers arranged in sequence and in contact with one another comprising:
(a) a first, inner layer comprising at least 50 wt % of at least one material independently selected from the following:
polyethylenes, polypropylenes, ethylene/α-olefin copolymers having at least one $C_3$ to $C_{10}$ α-olefin, propylene/ethylene copolymers, ethylene/vinyl acetate copolymers, polyamides, polyesters, polyvinyl chlorides, ionomers, and mixtures thereof,
(b) a second, inner frangible layer comprising approximately 0.1-30 wt % polybutene,
(c) a third, barrier layer comprising approximately 90-100 wt % of an ethylene vinyl alcohol copolymer having an ethylene content between approximately 38-44 mol %,
(d) a fourth, outer frangible layer comprising approximately 0.1-30 wt % polybutene, and
(e) a fifth, outer, layer comprising at least 50 wt % of at least one material independently selected from the following:
polyethylenes, polypropylenes, ethylene/α-olefin copolymers having at least one $C_3$ to $C_{10}$ α-olefin, propylene/ethylene copolymers, ethylene/vinyl acetate copolymers, polyamides, polyesters, polyvinyl chlorides, ionomers, and mixtures thereof.

29. An individual bag comprising:
a multilayer heat-shrinkable film comprising:
(a) an inner heat sealing layer,
(b) an outer heat sealing layer,
(c) an oxygen barrier layer positioned between the inner heat sealing layer and outer heat sealing layer,
(d) an inner frangible layer positioned between the inner heat sealing layer and the oxygen barrier layer, and
(e) an outer frangible layer positioned between the outer heat sealing layer and the oxygen barrier layer;
wherein the film has an oxygen gas transmission rate of less than about 70 $cm^3/m^2$ for a 24 hour period at 1 atmosphere, 0% relative humidity, and 23° C.;
wherein the film has a shrinkage value of at least 10% in both machine and transverse directions at 90° C.;
the film being formed into a bag defined by:
a lap seal connecting the inner heat sealing layer to the outer heat sealing layer, the lap-sealed film defining a flattened tube member having a first end and an opposing second end, a first bag wall and an opposing second bag wall, and a first bag edge and opposing second bag edge each extending between the first end and the second end of the flattened tube member; and
a first end seal connecting the inner heat sealing layer on the first bag wall with the inner heat sealing layer on the second bag wall between the first and second bag edges proximate to the first end of the tube member; and
wherein the film has a shrink force, the lap seal has a lap seal shear strength, and the first end seal has a first end seal peel strength, where both the lap seal shear strength and the first end seal peel strength are greater than the shrink force of the film at approximately 73° C.;
wherein the lap seal is peelable along a lap seal interface located between the outer heat sealing layer and the outer frangible layer, where the lap seal has a lap seal peel strength of about 250 to about 3000 grams per inch; and
wherein the first end seal is peelable along a first end seal interface located between the inner heat sealing layer and the inner frangible layer, where the first end peel strength is about 1400 to about 3000 grams per inch.

30. The bag, as defined in claim 29, wherein the lap seal peel strength is less than the first end peel strength.

31. The bag, as defined in claim 29, wherein the lap seal peel strength is about 350 to about 2000 grams per inch.

32. The bag, as defined in claim 29, wherein the lap seal peel strength is about 500 to about 700 grams per inch.

33. The bag, as defined in claim 29, wherein the first end seal peel strength is about 1400 to about 2000 grams per inch.

34. The bag, as defined in claim 29, wherein both the lap seal shear strength and first end seal peel strength are greater than the shrink force of the film at approximately 85° C.

35. The bag, as defined in claim 29, wherein both the lap seal shear strength and first end seal peel strength are greater than the shrink force of the film at approximately 99° C.

36. The bag, as defined in claim 29, further comprising a second end seal connecting the inner heat sealing layer on the first bag wall with the inner heat sealing layer on the second bag wall between the first and second bag edges proximate to the second end of the tube member;

wherein the second end seal has a second end seal peel strength, where the second end seal peel strength is greater than the shrink force of the film at approximately 73° C.; and wherein the second end seal is peelable along a second end seal interface located between the inner heat sealing layer and the inner frangible layer, where the second end seal peel strength is about 1400 to about 3000 grams per inch.

37. The bag, as defined in claim 36, wherein the lap seal peel strength less than both the first end seal peel strength and the second end seal peel strength.

* * * * *

UNITED STATES PATENT AND TRADEMARK OFFICE
CERTIFICATE OF CORRECTION

Page 1 of 1

PATENT NO.         : 8,039,070 B1
APPLICATION NO.    : 12/357264
DATED              : October 18, 2011
INVENTOR(S)        : Bradley Thomas Sawall et al.

It is certified that error appears in the above-identified patent and that said Letters Patent is hereby corrected as shown below:

In the Specification

In column 3, line 52, insert --The -- before "lap".

In column 16, line 34, delete "010.40" and insert -- of 0.40 --.

In column 21, line 44, delete "frangible" and insert -- "frangible --.

In the Claims

In column 23, line 66, in claim 9, insert -- the -- after "from".

In column 24, line 55, in claim 15, insert -- is -- after the first occurrence of "strength".

In column 28, line 7, in claim 37, insert -- is -- after the first occurrence of "strength".

Signed and Sealed this
Twelfth Day of April, 2016

Michelle K. Lee
*Director of the United States Patent and Trademark Office*